United States Patent
Schwind

(10) Patent No.: US 9,931,563 B2
(45) Date of Patent: Apr. 3, 2018

(54) DEVICES, SYSTEMS, AND METHODS FOR A TOUCHSCREEN GAMEBOARD

(71) Applicant: BG Global LLC, South Bend, IN (US)

(72) Inventor: Janet Schwind, Indianapolis, IN (US)

(73) Assignee: BG Global LLC, South Bend, IN (US)

( * ) Notice: Subject to any disclaimer, the term of this patent is extended or adjusted under 35 U.S.C. 154(b) by 125 days.

(21) Appl. No.: 14/849,355

(22) Filed: Sep. 9, 2015

(65) Prior Publication Data

US 2016/0067594 A1   Mar. 10, 2016

Related U.S. Application Data

(60) Provisional application No. 62/047,748, filed on Sep. 9, 2014.

(51) Int. Cl.
*A63F 3/00* (2006.01)
*A63F 9/24* (2006.01)
*A63F 13/843* (2014.01)
*A63F 13/90* (2014.01)
(Continued)

(52) U.S. Cl.
CPC ........ *A63F 3/00643* (2013.01); *A63F 3/0023* (2013.01); *A63F 13/2145* (2014.09); *A63F 13/31* (2014.09); *A63F 13/843* (2014.09); *A63F 13/90* (2014.09); *A63F 2003/00233* (2013.01); *A63F 2009/241* (2013.01)

(58) Field of Classification Search
CPC . A63F 3/00643; A63F 13/2145; A63F 3/0023
See application file for complete search history.

(56) References Cited

U.S. PATENT DOCUMENTS

2004/0248650 A1* 12/2004 Colbert ............... A63F 3/00643
463/37
2005/0097929 A1* 5/2005 Anderson ............... E05B 75/00
70/16
(Continued)

OTHER PUBLICATIONS chessbaron.com, Large Leatherette Chess Board 2_01232013_23by23by0.5inches.pdf, https://web.archive.org/web/20130123084308/https://www.chessbaron.com/chess-B2027.htm, published on Jan. 23, 2013, last accessed on Jun. 5, 2017.*

*Primary Examiner* — William H McCulloch, Jr.
*Assistant Examiner* — Yingchuan Zhang
(74) *Attorney, Agent, or Firm* — Reichel Stohry LLP; Natalie J. Dean; Mark C. Reichel

(57) ABSTRACT

Digital gameboard systems and devices for providing games and interactive content to two or more co-located users are described, as well as methods of using the same. A gameboard device of the present disclosure comprises a housing with a screen extending across the top thereof, and a mobile computer positioned within the housing. At least a portion of the device's screen comprises a touchscreen technology. Additionally, at least a portion of the gameboard device is foldable about at least one axis. Methods of using the devices and systems hereof are also provided, an exemplary method including the steps of downloading content to the aforementioned device, receiving input from at least two co-located users via the screen of the digital gameboard device, and displaying output via the screen of the digital gameboard device to the two or more co-located users in connection with the gaming program.

20 Claims, 6 Drawing Sheets

(51) Int. Cl.
*A63F 13/2145* (2014.01)
*A63F 13/31* (2014.01)

(56) References Cited

U.S. PATENT DOCUMENTS

| | | | |
|---|---|---|---|
| 2008/0076505 A1* | 3/2008 | Nguyen | G07F 17/32 463/16 |
| 2013/0083466 A1* | 4/2013 | Becze | G06F 3/1438 361/679.27 |
| 2014/0200056 A1* | 7/2014 | Liu | H04B 1/3877 455/575.8 |

* cited by examiner

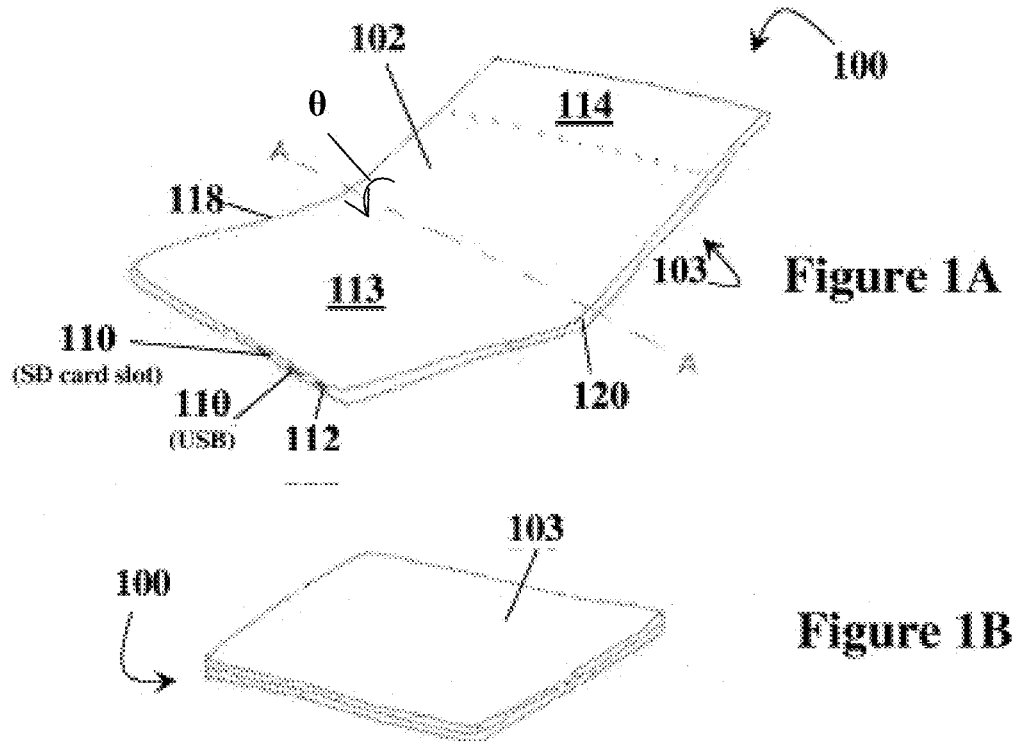
Figure 1A
Figure 1B
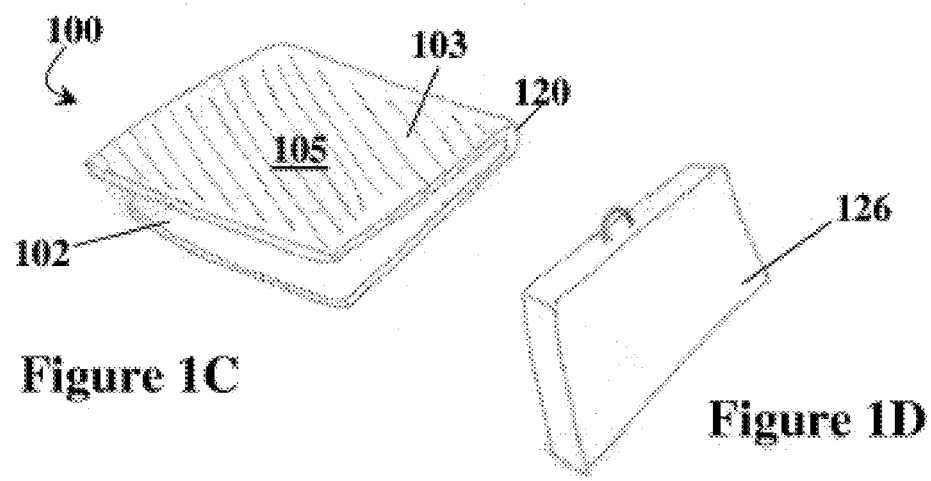
Figure 1C
Figure 1D

DEVICES, SYSTEMS, AND METHODS FOR A TOUCHSCREEN GAMEBOARD

PRIORITY

This application is related to and claims the priority benefit of U.S. Provisional Application Ser. No. 62/047,748 to Schwind, filed Sep. 9, 2014. The content of the aforementioned application is hereby expressly incorporated by reference in its entirety into this disclosure.

BACKGROUND

Board games are games that involve game pieces or pawns that are moved or placed on a pre-marked surface or "gameboard" according to a set of prescribed rules. Most board games are based on either luck, knowledge, strategy, or a combination thereof. While there are many varieties of board games, typically the game pieces/pawns are physically positioned on the surface of the gameboard. Additionally, conventional games may also use game cards, dice, or other physical components to facilitate play.

The actual gameboard itself is typically made of cardboard, wood, or the like and may be foldable for easy storage, or simply comprise a single piece of unbroken material. Most conventional board games use a standardized and unchanging gameboard (e.g., chess, checkers, and backgammon), but others use a modular board whose component tiles or cards assume varying layouts from one session to another, or may even change during gameplay. However, even with modular boards, the underlying gameboard itself and any associated components (i.e. pawns, cards, etc.) have traditionally been physical objects without any digital componentry.

In light of recent technological advances, increasing numbers of players are attracted to consoles and computer games as a result of their interactivity and endless variants. Because of this, many board games have been equipped with electronic elements. For example, some gameboards have incorporated the use of digital display technology as well as sound and/or light effects. Additionally, it is not uncommon for physical gameboards to incorporate electronic dice and/or RFID technology to identify tokens, players, playing cards, or the like.

Despite the incorporation of electronic elements, conventional physical gameboards and components still exhibit several disadvantages. For example, even considering the modular boards mentioned above, the layouts of physical gameboards are static, non-interactive, and—even where modular boards are employed—are frustrating to successfully modify, especially during gameplay. Furthermore, some physical board games literally have hundreds of pieces. The setup associated with such games can be considerable and misplacing or losing even one vital component can have a significant adverse impact on the players' ability to play and enjoy the underlying game. Still further, some board games have extensive and complex sets of rules the players must follow. While physical board games typically come with a printed rule book for reference, it is not uncommon for players to disagree as to rule interpretation, which will typically result in an adverse impact on the overall gameplay experience. Additionally, conventional, physical board games are cumbersome to store and, because people interested in playing board games typically purchase more than one, have a tendency to pile up and take up large amounts of space.

The virtual world offers plenty of board game simulations for PC game consoles and online or device-based gaming, which negate many of the disadvantages associated with physical board games. For example, the efficiencies provided by computer processors negate storage issues and make set-up and implementation of gameplay quick and straightforward. Digital and/or touchscreen technologies allow for the gameboard to be dynamic, and networks (e.g., the Internet) enable players to connect and play with/against remote players. Additionally, with computer-based gameplay, the rules are automatically enforced and the rules are not subject to interpretation. Illegal actions/moves are disallowed, points are accurately calculated, and the winner is automatically determined accordingly to the prescribed set of rules. Some computer-based games even provide tutorials such that players are not left to their own devices in learning the rules and how to play. However, most computer-based games are played with only one player or, where a network connection is available, only allow for virtual interaction with other players. As such, the social interaction and community experience provided by physical board games is necessarily lacking from the computer-based gaming experience.

Accordingly, devices and systems are needed that are capable of providing interactive, adaptable, and dynamic games and efficiencies of touchscreen computer technology along with the community play and in-person social interaction facilitated by traditional physical board games.

BRIEF SUMMARY

The present disclosure novel digital gameboard devices and systems, as well as methods for using the same to play games. In at least one exemplary embodiment, a foldable digital gameboard device is provided. Such a digital gameboard device comprises a housing with a screen extending across the top thereof, and a mobile computer positioned within the housing. The housing itself comprises a length, a width and a thickness, and at least a portion of the screen may comprise touchscreen technology. For example, the length of the housing may be at or between 20-25 inches, the width of the housing may be at or about 20-25 inches, and the thickness of the housing may be at or about 0.28-0.5 inches. Furthermore, the screen of the device may comprise a first section for displaying a virtual gameboard and/or application content and a second section for displaying user information, application rules, and a pop-up virtual keyboard or other input device.

Additionally, the mobile computer within the housing comprises a processor, a storage medium, and one or more applications. The one or more applications are executable by the processor and may be configured to interact with the storage medium of the mobile computer. Generally, the device is configured to be foldable about at least one axis and to provide games and interactive content to two or more co-located users by running at least one of the applications on the processor. Additionally, the device may be configured for network capabilities and/or comprise one or more ports and one or more switches. Still further, in certain embodiments, at least one of the applications executable by the processor may comprise a game development application configured to facilitate the user-led development of gaming applications, where the resulting gaming applications are executable on the device.

In at least one alternative embodiment, the device may be configured to move about the at least one axis between a substantially open configuration and a substantially closed configuration. In yet another exemplary embodiment, when the device is positioned in the substantially closed configuration, the screen is substantially encased within the housing.

Optionally, the device may further comprise one or more hinges positioned along at least a portion of the at least one axis. The one or more hinges may optionally be lockable. In such embodiments, the at least one lockable hinge may comprise a rod and at least two attaching means coupled therewith. Each of the attaching means may comprise a spring mechanism and additionally be coupled with a portion of the screen of the device. In yet another embodiment, the screen may comprise at least a first portion and a second portion, the first and second portions coupled together about the lockable hinge. There, the attaching means of the hinge may be utilized to couple the rod of the hinge with the portions of the screen, with each attaching means being coupled with the rod and either the first or the second portion of the screen.

Gameboard systems are also provided in the present disclosure. In at least one exemplary embodiment, such a novel gameboard system comprises a gameboard device configured to facilitate digital gameplay between two or more co-located users, and two or more handheld devices. In such systems, the gameboard device may comprise a housing comprising a length, a width, and a depth, a mobile computer positioned within the housing, and a screen extending across a top of the housing. The mobile computer of the device comprises a processor, a storage medium, and one or more applications executable by the processor and configured to interact with the storage medium. Furthermore, at least a portion of the screen of the device comprises a touchscreen technology. The gameboard device is configured to be foldable about at least one axis and to provide games and interactive content to two or more co-located users by running at least one of the applications on the processor. Additionally, each of the two or more handheld devices may be in two-way communication with the gameboard device and capable of sending and receiving data therewith. For example, in at least one embodiment, the gameboard device and the two or more handheld devices may each comprise Bluetooth technology through which the two-way communication is established. Additionally, each of the handheld devices may be in two-way communication with at least one of the other handheld devices of the system (alternatively, a handheld device may only be in communication with the gameboard device directly). Still further, each of the two or more handheld devices may be configured to form a secured connection with one other handheld device of the system and an unsecured connection with all of the other handheld devices of the system, with such secured and unsecured connections existing concurrently.

In certain embodiments of the gameboard system provided herein the two or more handheld devices are selected from the group consisting of private game screens, smartphones, computer tablet devices, and mobile computers. Furthermore, the gameboard system may additionally comprise a number of racks, the number of racks conforming to the number of handheld devices in use with the system. There, each rack may be configured to couple with and support a handheld device on a surface.

Methods for playing a game using a digital gameboard device are also provided. In at least on exemplary method described herein, the method comprises the steps of: providing any of the digital gameboard devices or systems provided herein; downloading interactive content to the mobile computer of the gameboard device, the interactive content comprising at least one gaming program; receiving input from at least two co-located users, via the screen of the digital gameboard device, to run the at least one gaming program; and displaying output, via the screen of the digital gameboard device, to the two or more co-located users in connection with the gaming program. Additionally, where the digital gameboard device is used in connection with two or more handheld devices, the steps of receiving input and displaying output may be affected, at least in part, by the two or more handheld devices. Still further, in at least one embodiment of the method described herein, the screen of the gameboard device may comprise at least a first portion and a second portion, with the first and second portions coupled together about a lockable hinge. There, the lockable hinge may comprise a rod and at least two attaching means coupled therewith, with each of the attaching means comprising a spring mechanism and coupled with either the first or second portions of the screen. In such embodiments, the method may further comprise the step of folding the device about the at least one axis such that the first portion of the screen is visible from a first location and the second portion of the screen is visible from a second location. Still further, the step of displaying output may further comprise displaying output to the first co-located user positioned in the first location via the first portion of the screen and displaying output to the second co-located user positioned in the second location via the second portion of the screen, wherein the first portion of the screen is not visible from the second location and the second portion of the screen is not visible from the first location.

BRIEF DESCRIPTION OF THE DRAWINGS

FIGS. 1A-1C are perspective views of an exemplary gameboard device of the present disclosure. FIG. 1A depicts the gameboard device in approximately an open configuration, FIG. 1B depicts the gameboard device in a closed configuration, and FIG. 1C depicts the gameboard device in approximately a closed configuration.

FIG. 1D is a perspective view of a carrying case for the exemplary gameboard device of FIGS. 1A-1C.

Figure 1E:
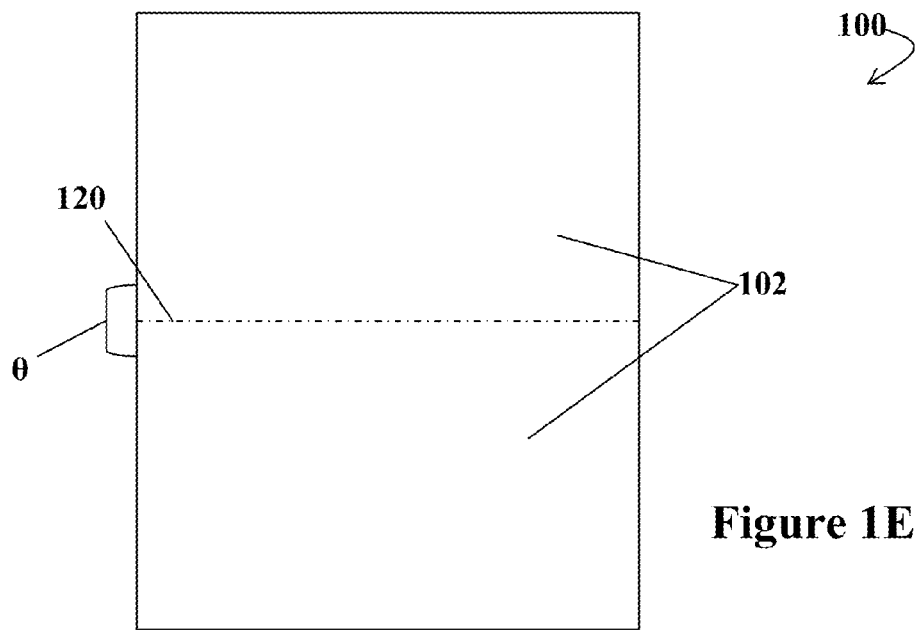
FIG. 1E is a front view of an exemplary gameboard device of the present disclosure.

An overview of the features, functions and/or configurations of the components depicted in the various figures will now be presented. It should be appreciated that not all of the features of the components of the figures are necessarily described. Some of these non-discussed features, such as various couplers, etc., as well as other discussed features are inherent from the figures themselves. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended, with any additional alterations and modifications and further applications of the principles of this disclosure being contemplated hereby as would normally occur to one skilled in the art. For example, while this technology may be illustrated and described in a preferred embodiment, the touchscreen gameboard devices and systems may comprise many different configurations, forms, materials, and accessories.

Furthermore, wherever feasible and convenient, like reference numerals are used in the figures and the description to refer to the same or like parts. The drawings are in a simplified form and not to precise scale. For purposes of convenience and clarity only, directional terms, such as top, bottom, right, left, up, down, over, above, below, beneath, rear, and front may be used with respect to the accompanying figures. These and similar directional terms should not be strictly construed to limit the scope of the invention. In addition, words such as attached, affixed, coupled, connected, and similar terms with their inflectional morphemes are used interchangeably, unless the difference is noted or made otherwise clear from the context. These words and expressions do not necessarily signify direct connections, but include connections through mediate components and devices.

The disclosure of the present application provides novel devices and systems for a touchscreen gameboard. Generally, in certain exemplary embodiments, the size and dimensions of the touchscreen gameboards hereof may be larger than traditional tablet computers and more similar to those of traditional, physical board games. However, unlike conventional board games, the gameboard devices and systems of the present disclosure are capable of providing the feel and efficiencies of touchscreen mobile computer technology. Indeed, the devices and systems described herein provide for an efficient, enhanced and dynamic gaming experience while simultaneously promoting the community and social aspects associated with co-located individuals playing a physical board game.

Now referring to FIGS. 1A-1C, the gameboard device 100 of the present disclosure is shown. The gameboard device 100 of FIG. 1A comprises an ultrathin profile and is substantially rectangular or substantially square in shape. Nevertheless, it will be appreciated that the gameboard device 100 may be configured in any shape, having any thickness, and/or with dimensions as may be appropriate for use in connection with community gameplay between co-located users. In one exemplary embodiment, the device 100 has a length of or between about 20 inches to about 25 inches, a width of or between about 20 inches to about 25 inches, and a depth or thickness of at or between about 0.28 inches to about 0.5 inches.

The gameboard device 100 may comprise a single, unbendable unit or, alternatively, be configured to fold up. For example, the gameboard device 100 of FIG. 1A is foldable along centerline A-A about a crease/hinge 120 similar to a traditional, physical board game. Accordingly, the device 100 is capable of moving between an open configuration (in at least one embodiment, a fully open configuration comprising an angle θ at or near 180°) to a closed configuration (see FIGS. 1B and 1C, where angle θ is less than about 180° (FIG. 1C) or at or near 0° (FIG. 1C)), and vice versa about the crease/hinge 120. In this manner, the gameboard device 100 can reduce its profile and/or size, which can be beneficial for storage and or transport purposes (e.g. such as within a pouch or other container). Additionally, when users are ready to operate the gameboard device 100 to play a game, the gameboard device 100 is simple and easy to unfold (or open) and set up.

Still further, the gameboard device 100 may comprise a single or multiple creases/hinges 120 positioned thereon such that the device 100 can be folded into one or more desired folded configurations. For example, in at least one exemplary embodiment, the gameboard device 100 comprises one or more creases/hinges 120 positioned such that the screen 102 (or a portion thereof) can easily be stood upright on a flat surface and/or concurrently used by more than one person while providing private screens to each player (see, for example, the folded configuration shown, positioned upright, of FIG. 1F). It will be appreciated that while at least one specific example of the upright, folded configuration is described, the one or more creases/hinges 120 may be positioned across the device 100 as appropriate to achieve a desired folded configuration.

The foldable nature of the gameboard device 100 may be achieved either through material selection and/or the incorporation of one or more hinges into the design. It will be appreciated that while a single crease/hinge 120 is shown in the embodiments of FIGS. 1A-1C, depending on the overall shape and dimensions of the gameboard device 100, additional or other arrangements of the hinges/creases 120 may be employed. For example, and without limitation, a device 100 may be configured with two creases/hinges 120 such that the gameboard device 100 is divided into three sections, with the two outer sections configured to fold in and cover the inner portion when moved to the closed configuration. Furthermore, the gameboard device 100 may be configured such that the crease/hinge 120 may or may not be visible when the gameboard device 100 is positioned in its open configuration.

In addition to facilitating transport and storage, the folding aspect of the gameboard device 100 also serves to protect the device's 100 more fragile componentry. As will be described in further detail below, the top portion of the device 100 comprises a screen 102 and the bottom portion comprises a backing 103. While the screen 102 may be comprised of the most durable material possible, it may still be susceptible to scratches and/or cracking due to its fundamental nature. However, it is typically preferred that the backing 103 of the device 100 is made from heavier and more durable materials, such as hard plastics, rubber, metal, etc., to protect the interior componentry of the device 100. Accordingly, when the device 100 is moved to the folded configuration, the more fragile screen 102 is substantially encased within the more durable backing 103 such that it is protected thereby.

The backing 103 may also be comprised of, or coated in, an anti-skid or tacky material 105 (see FIG. 1C) to prevent movement of the device 100 during gameplay. Specifically, during gameplay, the device 100 is positioned in the open configuration on a surface and the increased friction created between the material 105 on the backing 103 and the underlying surface. Accordingly, the 105 material prevents even the most animated users from moving the device 100 as they interact therewith in playing a game. As most anti-skid or tacky materials 105 also exhibit protective qualities, when the device 100 is moved to the closed configuration, any anti-skid/tacky material 105 on the backing 103 may also function to further protect the less durable components of the device 100.

Referring back to the crease/hinge 120 of the gameboard device 100, in at least one exemplary embodiment, the device 100 comprises a crease/hinge 120 that is lockable. The lockable functionality of the crease/hinge 120 may either be automatic (i.e. the crease/hinge 120 automatically locks when it is moved to the targeted position) or manually lockable by a user (i.e. manually triggered). Additionally, where a crease/hinge 120 is configured to be moveable between various positions, any combination of automatic and manual locking functionality may be employed.

As previously noted in connection with FIGS. 1A-1C, the device 100 can move between open and closed configurations. Where the crease/hinge 120 comprises a locking mechanism (whether automatic or manual), the device 100 can thus be locked in the desired configuration (i.e. open or closed). For example, the crease/hinge 120 of the gameboard device 100 may be locked (or configured to automatically lock) when the device 100 is positioned in an open, flat configuration to facilitate use. Alternatively, the gameboard device 100 may be locked (or configured to automatically lock) when the device 100 is positioned in the closed configuration about the crease/hinge 120 for safe storage or transport. Accordingly, in operation, where the gameboard device 100 comprises a crease/hinge 120 that is lockable, the gameboard device 100 is manipulated into the desired position (i.e. folded around one or more creases/hinges 120) and then locked in place (automatically or manually).

Figure 1F:
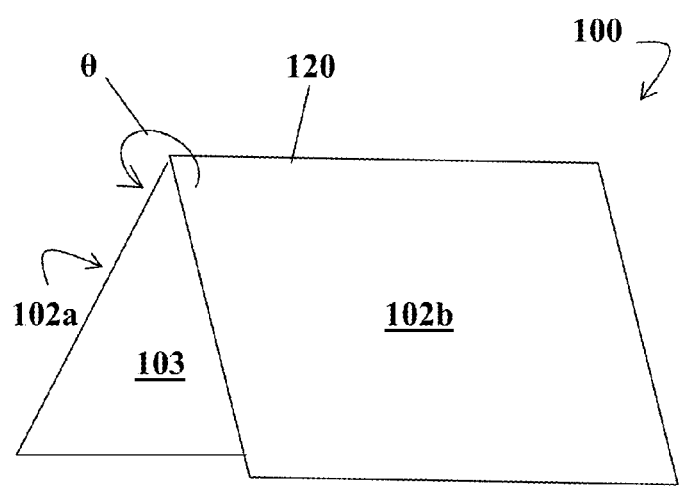
FIG. 1F is a perspective view of the gameboard device of FIG. 1E in approximately a folded configuration.

In addition to locking the device 100 in either an open or closed configuration, the locking mechanism of the crease/hinge 120 may additionally be used to lock the device 100 in one or more variations of the open configuration. For example, as shown in FIGS. 1E and 1F, in at least one embodiment, the device 100 may comprise a single crease/hinge 120 that is configured for full rotation about its crease/hinge 120 (i.e. the screen 120 may rotate about the crease/hinge 120 such that angle θ may comprise anywhere between 0° and about 360°). There, the device 100 can be folded and the crease/hinge 120 can be locked at the desired angle(s) θ. It will be appreciated that the locking mechanism of each crease/hinge 120 is fully customizable such that each crease/hinge 120 may be configured to have one or more automatic locking points set at various preset angles θ (e.g., the device 100 comprises four automatically locking points—when the angle θ comprises at or near 0° (closed configuration), when the angle θ comprises between about 240-300° (teepee configuration discussed below), when the angle θ comprises about 180° (fully open configuration), and when the angle θ comprises about 360° (fully folded configuration)). Additionally or alternatively, each crease/hinge 120 may be configured so that a user can manually lock the crease/hinge 120 to hold any desired angle θ.

At least one beneficial application of the locking functionality of the crease/hinge 120 is that the gameboard device 100 can be folded and held at an angle θ comprising greater than 180° as shown in FIG. 1F. In this manner, the screen 102 is divided into two screens 102a, 102b and the device 100 can independently be stood upright on a surface in a teepee-like or triangular shape. It will be appreciated that such an upright configuration may be beneficial not only for a single player playing a game (perhaps where hands-free use is desirable), but also where two or more players desire to utilize the device 100 while keeping their portion of the screen 102 private from their opponent(s). While such a configuration may be achieved without the locking mechanism of the crease/hinge 120, it will be appreciated that being able to lock the crease/hinge 120 to achieve and hold the desired angle θ lends stability to the device 100 and prevents its inadvertent collapse or movement to another position during play.

In addition to facilitating an upright position of the device 100, a lockable crease/hinge 120 may also provide other benefits. In at least one embodiment, it may be desirable that the gameboard device 100 can be reduced in size during use (e.g., for use in a small space, such as the interior of a car). Here, the gameboard device 100 may be folded about its one or more creases/hinges 120 and locked to achieve a smaller overall dimension of the screen 102. In this manner (and depending on the placement of the one or more creases/hinges 120) the overall size of the device 100 can be reduced while at least a portion of the screen 102 is accessible. For example, where the device 100 comprises a single crease/hinge 120 positioned at or near the middle of the screen 102 as shown in FIG. 1E, the crease/hinge 120 may be opened and locked such that the angle θ is held at or around 360°. Such crease/hinge 120 positioning thus folds the screen 102 in half and sandwiches the backing 103 of each half together. Additionally, where the backing 103 comprises a tacky material 105, the backing 103 itself can further act to lock the device 100 in the folded configuration (i.e. tacky surface to tacky surface).

Figure 2A:
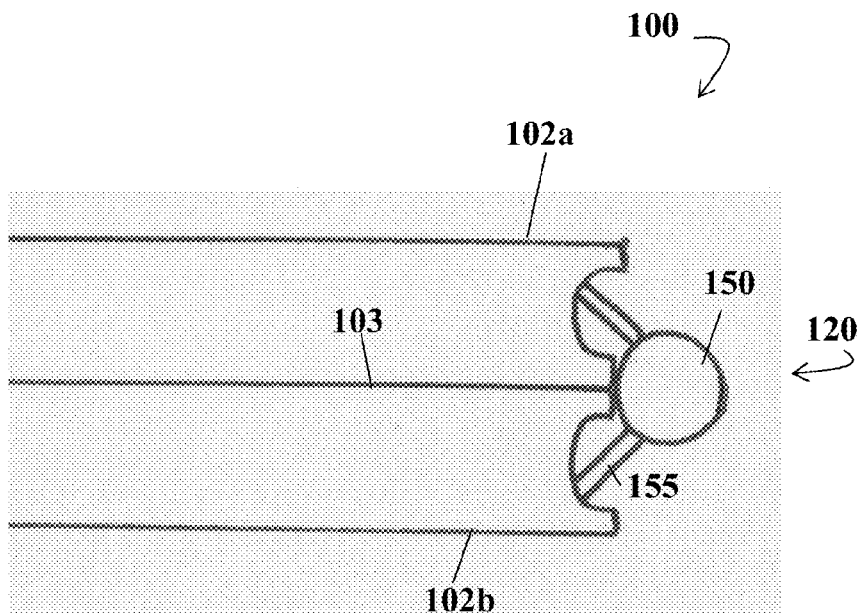
FIGS. 2A-2D are cross-sectional views of an exemplary lockable hinge component of the present disclosure in various positions.
Figure 2B:
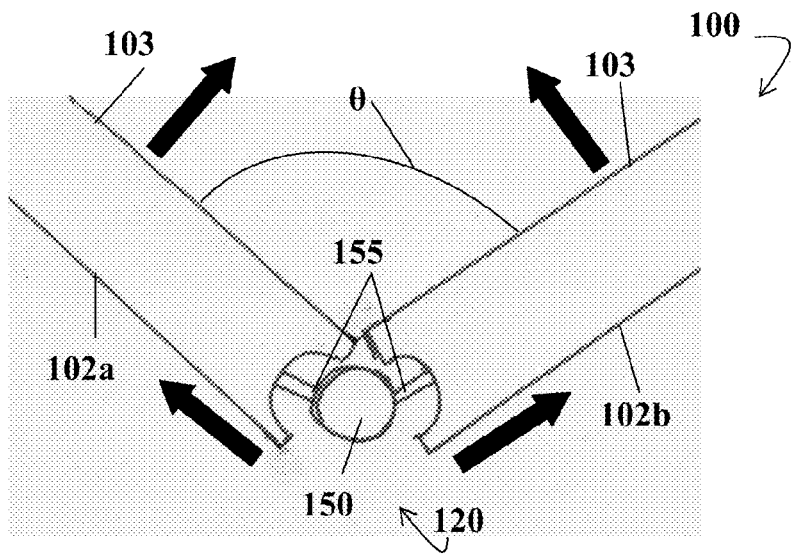
Figure 2C:
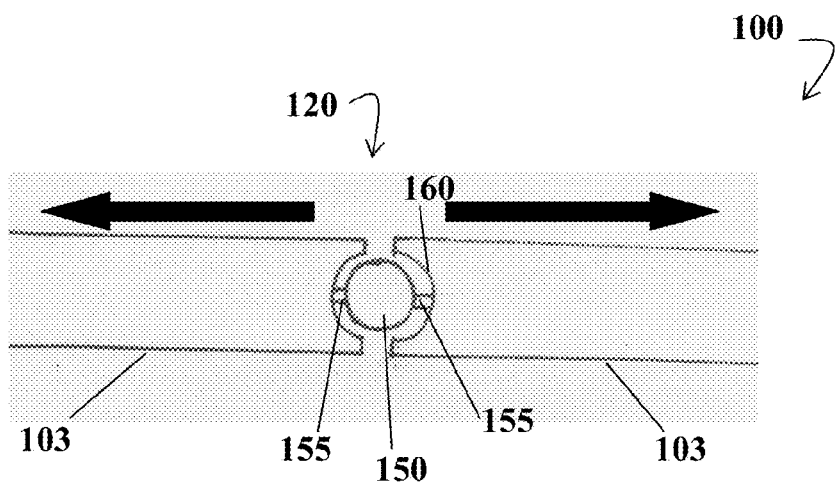

FIGS. 2A-2D illustrate at least one embodiment of a lockable hinge 120 of the device 100. There, hinge 120 comprises a spine or rod 150 that extends along at least a portion of the crease/hinge 120 of the device 100. In such embodiments, screen 102 is divided into two or more portions that are coupled together via the hinge 120. Accordingly, as shown in FIGS. 2A-2C, attaching means 155 may be employed to couple the hinge 120 with each portion of the screen (for example, 102a and 102b).

Figure 2D:
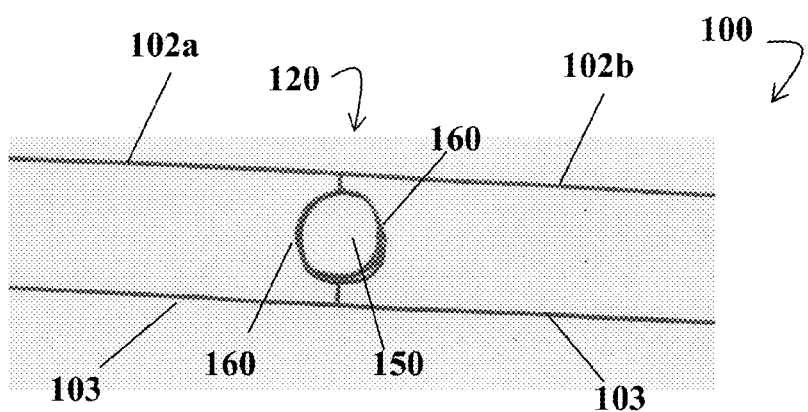

In at least one exemplary embodiment, the attaching means 155 coupled with the screens portions 102a, 102b and/or the lockable hinge 120 may further comprise a spring-like mechanism biased to keep the screen portions 102, 102b and the hinge 120 coupled therewith in close proximity to each other (see FIG. 2D). Accordingly, while the attaching means 155 may be stretched by pulling the two portions 102a, 102b of the screen 102 apart or away from the hinge 120 (see FIGS. 2B and 2C, with the arrows representative of the direction of force applied to pull the components apart and to rotate the component around the hinge 120) for folding or unfolding the device 100, the spring-like mechanism functions to draw the two portions 102a, 102b of the screen 102 back into contact with the rod 150, effectively snapping and holding the two portions 102a, 102b in place when pressure is not applied thereto. Furthermore, it will be appreciated that the ends of the screen portions 102a, 102b that couple with the attaching means 155 may comprise a channel or concave surface 160 configured to mold around or otherwise receive at least a portion of the rod 150 therein when the device 100 (see, for example, FIG. 2D). Accordingly, when the lockable hinge 120 is in the open configuration, the rod 150 of the hinge 120 is seated within the device, the two or more portions 102a, 102b of the screen 102 fit and lock together tightly and cleanly without a gutter or opening extending therebetween, and a continuous screen 102 is provided with minimal to no disruption between the portions 102a, 102b.

While at least one embodiment of a lockable hinge 120 has been described, it will be appreciated that the gameboard device 100 may comprise any type of lockable crease/hinge 120 contemplated in the relevant arts or hereinafter developed and no limitation is intended by providing specific embodiments.

Games and other content in the form of software applications may be run on the gameboard device 100. Such applications are accessible by or compatible for execution on the device 100 and, in at least one embodiment, are developed exclusively for use therewith such that they maximize utilization of the gameboard device's 100 unique functionalities and feature sets. It will be appreciated that any type of traditional or non-traditional board games may be converted into a game application for use with the gameboard device 100. For example, the device 100 can support digital versions of Monopoly®, Scrabble®, checkers, chess and the like, as well as children's developmental learning activities, card games, dice games, puzzles, and any other type of gaming or activity format. Effectively, game applications that are compatible with and executable on the gameboard device 100 can be created for any game or activity.

Execution of traditional board games in a digital format using the gameboard device 100 greatly enhances the users' gaming experience. Primarily, dynamic graphics, video, audio, and many other experience-enhancing characteristics may be incorporated into the traditional board games, thereby resulting in a refreshing and new experience for the users without losing the community interaction associated with co-located users. Additionally or alternatively, social media platforms may be integrated with the gameboard device 100 to enhance user experience. For example, in at least one embodiment, winning scores and/or other user data may be immediately linked with and/or posted to social media accounts via the gameboard device 100 (e.g., by a player hitting a social media icon or the like).

Depending on each gameboard device's 100 configuration and the games themselves, games and/or content can either be downloaded to the gameboard device 100 (individually and/or by subscription to a service), or accessed via the Internet or other network as web applications. Due to the unique properties of the device 100 and its dimensions, groups of users can gather around the gameboard 100 for in-person gameplay, albeit on a digital and adaptable platform. It will be understood that the devices and systems described herein can be configured to accommodate an unlimited number and variety of games and content applications geared towards multiple participant, in-person gameplay and may be customizable pursuant to user-defined specifications.

Furthermore, the gameboard device 100 may additionally comprise a corresponding carrying case 126 (see FIG. 1D). The carrying case 126 may be used to encase the gameboard device 100 during transport and/or storage to further ensure the device 100 is not damaged. In certain embodiments, the carrying case 126 comprises an interior configured to snugly and securely receive the gameboard device 100 when positioned in its closed configuration. Accordingly, a carrying case 126 may be designed specifically for each gameboard device 100 such that a carrying case 126 properly fits even gameboard devices 100 having irregular shapes, dimensions and/or folding configurations. Additionally, in at least some embodiments, the carrying cases 126 may further comprise compartments for any of the gameboard device's 100 related components (e.g., power cords, in-car chargers, microphone, camera, external speakers, etc.).

Figure 3:
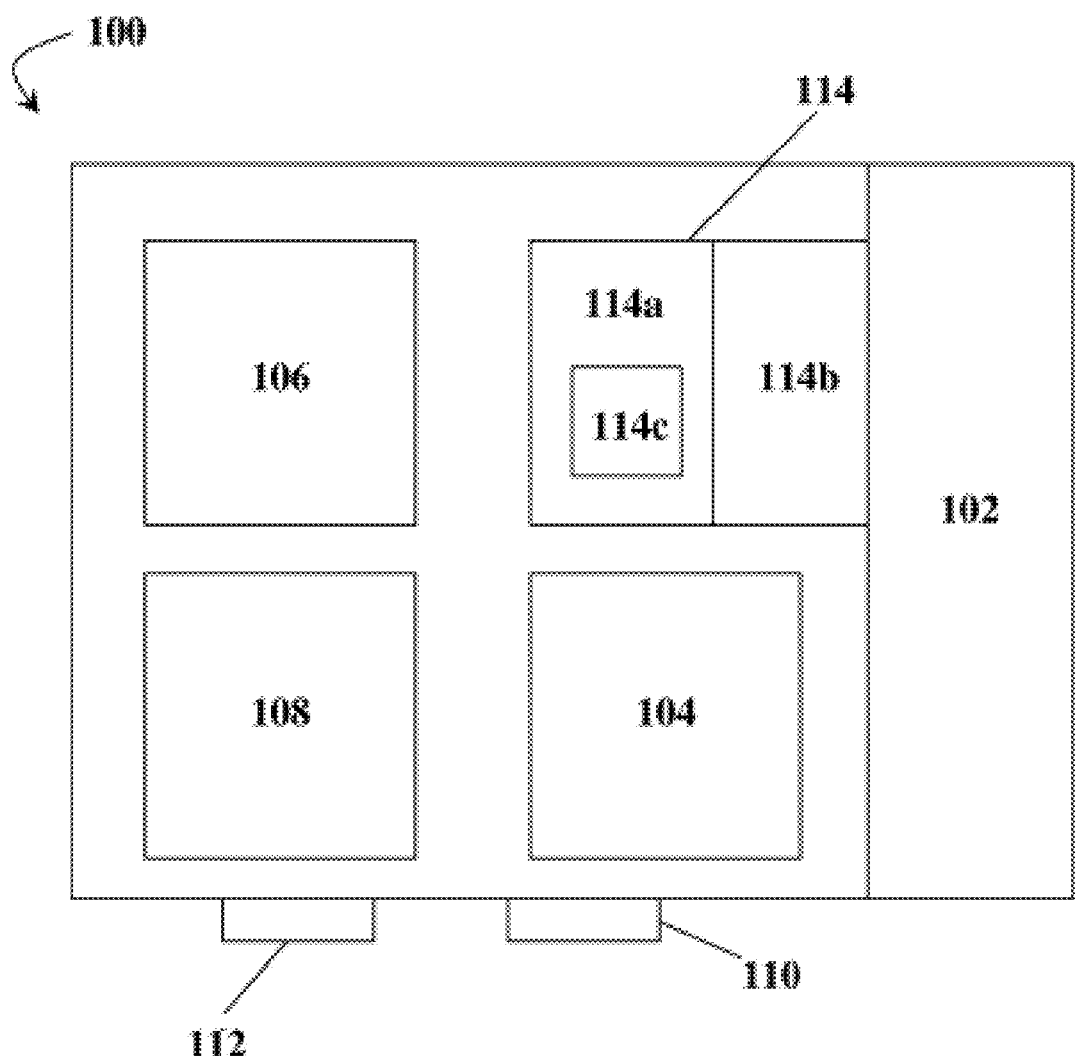
FIG. 3 is a high level block diagram of the hardware and software components of the exemplary gameboard device of FIGS. 1A-1C.

Referring now to FIG. 3, a high level block diagram is shown of a gameboard device 100. Here, the gameboard device 100 comprises a mobile computer having a touchscreen configured to provide games and other interactive activities to two or more co-located individuals. Generally, the platform of the device 100 is based on any tablet or other mobile computer now known or hereinafter developed that can be configured to achieve this purpose. In at least one embodiment, the gameboard device 100 comprises a screen 102, circuitry/processors 104 (which may include single or multi-core processors such as Snapdragon and the like, graphics processing units, etc.), memory and storage medium 106, a power supply 108, one or more ports 110, and at least one switch 112.

The hardware of the device 100 may be configured as known in the art for such mobile computers and tablets. For example, and without limitation, the power supply 108 may be internal to the device 100 (such as a rechargeable lithium-ion polymer battery or the like), external to the device 100 (such as in an embodiment configured to receive power through a power cord plugged into an outlet), or a combination of both internal and external configurations. In any of the aforementioned embodiments, the power supply 108 may be coupled with one of the ports 110 that is configured to receive either a dedicated charger, a USB connector, or the like, such that the power supply 108 and/or gameboard device 100 may receive power and, in certain embodiments where an internal battery is used, store a charge. Similarly, memory and storage medium 106 may comprise RAM chips, hard drives, flash memory, or other appropriate storage mediums, and may be provided in any quantity deemed appropriate for the desired application. For example, in at least one embodiment, the device 100 may comprise at least 1 GB RAM and at least 8 GB flash memory. Additionally or alternatively, where the device 100 is network compatible (described below), some or all of the storage medium 106 may be cloud-based.

The device 100 may have one or more ports 110. The one or more ports 110 serve as an interface between the device 100 and other computers, power sources, and/or peripheral devices. As previously described, one or more of the ports 110 may comprise a power port configured to couple with a power source. Additionally or alternatively, depending on the performance levels and/or feature sets desired, the device 100 may have any number of ports 110, which may consist of any combination of port types known in the art including, without limitation, digital visual interface ports, display ports, ESata ports, IEE 1394 interface ports, PS/2 interface ports, serial ports, USB ports, VGA ports, SCSI ports, HDMI ports, audio ports, and expansion slots (such as, for example, an SD or SDXC card slot). The ports 110 may be used to connect peripheral devices to the gameboard device 100, which may include input devices (e.g., a separate keyboard, etc.), external speakers, headphones, accessory adaptors for connecting to external displays such as a TV or monitor, etc.

Likewise, the device 100 may comprise one or more switches 112. In at least one embodiment, the device 100 only comprises a single power switch 112—such as a button, for example—configured to turn the gameboard device 112 on and off. Despite this embodiment, it will be appreciated that the device 100 may comprise any number of switches 112 and that such switches 112 may be configured and/or customized to support particular functionality (e.g., modifying speaker volume (speakers described below), modifying screen 102 settings, quick-start applications programmed to bypass menu queues and immediately start an assigned application, etc.).

In addition to the hardware components, the gameboard device 100 comprises any software 114 (operational and application) that would occur to one skilled in the art to achieve the functionality set forth herein. For example, as shown in FIG. 3, the software 114 comprises an embedded operating system 114*a*, a user interface 114*b* and other application programs 114*c*, which interact with the hardware of the device 100 including the circuitry/processor 104 and memory and storage medium 106. Similar to tablet computers known in the art (e.g., Amazon.com, Inc.'s Kindle Fire™ and/or Apple, Inc.'s iPad), the gameboard device 100 may be built on its own exclusive embedded software system. In at least one exemplary embodiment, the operating system 114a comprises Android, iOS or any other mobile operating system now known or hereinafter developed that is operable with the device 100 in light of its intended functionality and specified configurations. The application programs 114c comprise any applications needed to enable the device 100 to provide the functionality and feature sets described herein, including without limitation, game engines, a user interface 114b, and the like. Furthermore, specific games and content to be played on the device 100 may be further enabled by downloading and installing application software (i.e. mobile apps) through application distribution platforms. Details regarding use of the gameboard device 100 in connection with gaming, including the user interface and embodiments thereof, will be described in further detail below.

In at least one embodiment, the gameboard device 100 comprises networking capability such as built-in WiFi and/or cellular connectivity such that the device 100 can perform Internet functions such as web-browsing and emailing. For example, the device 100 may include a browser application, which not only provides users with direct access to online stores for purchasing applications, games and other content, but also allows for off-device cloud computation and easy access to cloud-based storage. Moreover, users can easily access information regarding their games of choice including tutorials on how to play, game strategy and the like. Furthermore, the touchscreen gameboard device 100 may have built-in Bluetooth technology such that it can exchange data with other Bluetooth compliant devices over short distances.

Depending on the desired features and functionality, the device 100 may optionally comprise a variety of additional components. For example, in at least one embodiment, the device 100 comprises one or more integral speakers 118 such that the games and other applications run on the device 100 can comprise audio components, or the device 100 can simply be used to play background music while in use. Additionally or alternatively, the touchscreen gameboard device 100 may comprise one or more sensors or other input devices (not shown). Such sensors/input devices may include light sensors, audio sensors, or other components configured to receive input. For example, an ambient light sensor can be used to automatically adjust screen brightness. Still further, one or more of the sensors may comprise a single- or multi-axis accelerometer for use in determining screen orientation relative to a user. Indeed, in at least one embodiment, the touchscreen gameboard 100 device does not have an intrinsic orientation, but instead is relative to each user. For example, in such embodiments, the screen 102 is configured to rotate in all orientations such that the gameboard device 100 faces each user on their turn.

As previously mentioned, the touchscreen gameboard device 100 comprises a screen 102. The device 100 is configured such that, in operation, all (or almost all) of the input is given by the users through the screen 102. The screen 102 may comprise any display or output device configured with touchscreen technology now known or hereinafter developed. For example, the screen 102 of the touchscreen gameboard device 100 may comprise a liquid crystal display ("LCD") comprising capacitive and/or resistive touchscreen technologies. Additionally or alternatively, the screen 102 (or sections thereof) may comprise an LED touchscreen and/or an electronic-ink ("E-ink") display, which is a display layer formed by electrically charged, electrophoretically mobile particles capable of translating through a dispersion fluid (dielectric fluid) upon application of an electric field to the medium. In at least one exemplary embodiment, at least a portion of the screen 102 comprises a touchscreen LCD with fingerprint- and scratch-resistant glass designed to be controlled by bare fingers, although certain alternative embodiments (or designated areas of the screen 102) may be configured for use with styli or the like. Additionally, the surface of the screen 102 may comprise a matte finish (similar to known eReaders) or a glossy finish, depending on user preference and desired applications of the device 100.

Referring back to FIG. 1A, the screen 102 is where any game or content that is run on the gameboard device 100 is depicted via the user interface 114b. Referring back to the description of the crease/hinge 120, the screen 102 may comprise a single, continuous unit where, when the gameboard device 100 is in the fully open configuration (i.e. the angle θ comprises at or near 180°), the crease/hinge 120 is not visible at all or only slightly visible. Alternatively, the screen 102 may comprise two or more independent units coupled together by the crease/hinge(s) 120 such that the crease(s)/hinge(s) are slightly or even clearly visible when the gameboard device 100 is in the open configuration or, in the case of the lockable hinge 120 embodiment of FIGS. 2A-2D for example, the hinge 120 may be configured such that the screen portions 102a, 102b fit together tightly to minimize the hinge 120 visibility. Where the screen 102 comprises two or more independent units, the various units may be programmed to work together such that a continuous image can be shown across the entire top surface of the gameboard device 100. Additionally or alternatively, the individual screen 102 units can be used to display independent features and/or components thereon.

Along these same lines, it is contemplated that two or more independent gameboard devices 100 may be positioned adjacent to one another (touching or close to touching) and the various devices 100 may be programmed to communicate with each other and synchronize a single display across the screens 102 thereof. In this manner, multiple gameboard devices 100 can be combined and synchronized to achieve a larger game playing surface that may be accessible to more players and/or able to display a larger and/or more complex gameboard or other display.

Irrespective of whether or not the screen 102 is comprised of a single or multiple units (i.e. screen portions 102a, 102b) or devices 100, in at least one embodiment, the screen 102 is divided into at least two sections—a gaming section 113 and an information section 114. Here, the gaming section 113 typically comprises the majority of the screen 102 and is where the game is played and/or any general content and game board is depicted. Conversely, the information section 114 (situated at one end as shown in FIG. 1A or otherwise) is a space reserved apart from the gaming section 113 to display game rules, play tips, game information, and/or other instructions or user information. The content of the information section 114 is fully customizable between different games and pursuant to user preference. For example, certain games employ game cards to facilitate play (e.g. Monopoly® or Trivial Pursuit®). For such games, the virtual game cards are displayed in the information section 114, apart from the virtual "game board" (displayed in the gaming section 113). Accordingly, it will be appreciated that the dimensions of the information section 114 may vary between games/applications as certain games may require a larger information section 114 to accommodate lengthy rules and/or virtual game cards and other game-related elements.

Additionally or alternatively, it will be appreciated that all of the content displayed in either the gaming or information sections 113, 114 may be adapted for display on a single gameboard in light of the game being played. For example, where the game being played on the gameboard device 100 is a card game where a degree of privacy is desired with respect to each player's cards, the card graphics themselves may be modified to this end. There, a "tap" feature may be employed to further player privacy. In at least one embodiment, this "tap" feature enables a player to view a reduced-size display of his or her card value(s) such that he or she can easily block the same from the other players' views. For example, in at least one embodiment, a player may tap a card graphic that displays the card facedown to all players, thus flipping up a single edge of the facedown card graphic such that that player can view the card value, but easily shield the same from the other players and thus keep it private.

Now referring back to the information section 114, the information section 114 can also be used to display player names and scores, player profiles (which could include photographs uploaded or downloaded to the device 100), or any other information desired. Along these lines, the information section 114 may also optionally comprise a pop-up virtual keyboard (not shown) for use in connection with inputting data into the device 100 (to create content for the information section 114 or otherwise). Game rules and/or instructions may come with a downloaded and/or purchased game software application, or a user can use the virtual keyboard and other input devices/components to create user profiles and/or their own games and rules therefore. As is known in the art, such a virtual keyboard can be hidden when not needed and activated for display only when a user wishes to provide input.

Custom game applications can also be created using the gameboard device 100. In at least one embodiment, the device 100 is configured to accommodate a user inputting their own rules for specific, previously established games, such as card games. In such cases, the user-input rules are displayed in the information section 114.

Users can also use the device 100 to develop entirely new games. For example, in at least one embodiment, the gameboard device 100 comes with a game development application preloaded that is configured to facilitate game creation. Perhaps more specifically, the game development application provides templates to facilitate game creation by providing options and design components for users to consider and select pursuant to their preferences. For instance, and without limitation, a user may be prompted by the game development application to indicate if the game will utilize a deck of cards, dice (and how many), puzzle pieces, etc.; to select game pieces and assign values, credentials, relationships, and/or conditions thereto; and to specify goals, desired outcomes, rules and conditions for gameplay. In at least one exemplary embodiment, any user-developed games created through use of the game development application are automatically or selectively ported to a common database (e.g., an online database or server). These user-developed games may then be made available to other users of the gameboard device 100 via a website or other distribution platform for a fee, at no charge, or as open source applications.

In operation, the gameboard device 100 is positioned in an open configuration, placed on a surface (either upright or flat, as desired), and powered up using the power switch 112. Using the touchscreen functionality of the screen 102, two or more players interact with the device 100 and select the desired game. If the desired game has not been previously loaded on the device 100, the users may either download the desired application from an application distribution platform via a network such as the Internet or otherwise or, alternatively, access the game through a web-based application.

When the desired game is queued on the device 100, the gaming section 113 displays the game's gameboard and the information section 114 displays the rules, information, game cards, dice, timers, and/or any other gaming tools needed to facilitate play of that particular game. For example, if the game to be played is Monopoly®, the gaming section 113 displays the gameboard consisting of 40 spaces arranged in a square, and the information section 114 displays the "Chance" and "Community Chest" cards, along with the game rules, user/player information as well as any additional information specified by the users. The information section 114 may also display any customized user content such as user profiles, as well as a running tally of overall points, penalties and the users' scores, as applicable.

The gameplay occurs in the gaming section 113 and substantially consists of the players interacting with the screen 102 via touch. For example, the players can move the digital markers or game pieces around the digital board displayed on the screen 102 using their fingers. Thereafter, the gameboard device 100 interactively displays correlated information on the screen 102 (i.e. automatically adapts the digital board in the gaming section 113 in accordance with a user's most recent move, updates the users' scores in the information section 114, etc.). However, the method in which user interaction with the gameboard device 100 occurs is largely dependent on the particular game being played. Accordingly, it is understood that certain games may employ the speakers 118, virtual keyboard (not shown), or any other input component of the device 100 in conjunction with the touchscreen functionalities of the screen 102.

When/if the users reach a point in their game where they need to take a break, the gameboard device 100 can "save" the users' progress (i.e. the position of the markers/game pieces on the virtual board, move history, the score, etc.) such that it can be restored for later play. Along these same lines, the gameboard device 100 is capable of saving records of gameplay history such that if a series of games is played over time, users can access the records and evaluate past scores, time spent in play, and the like.

Figure 4:
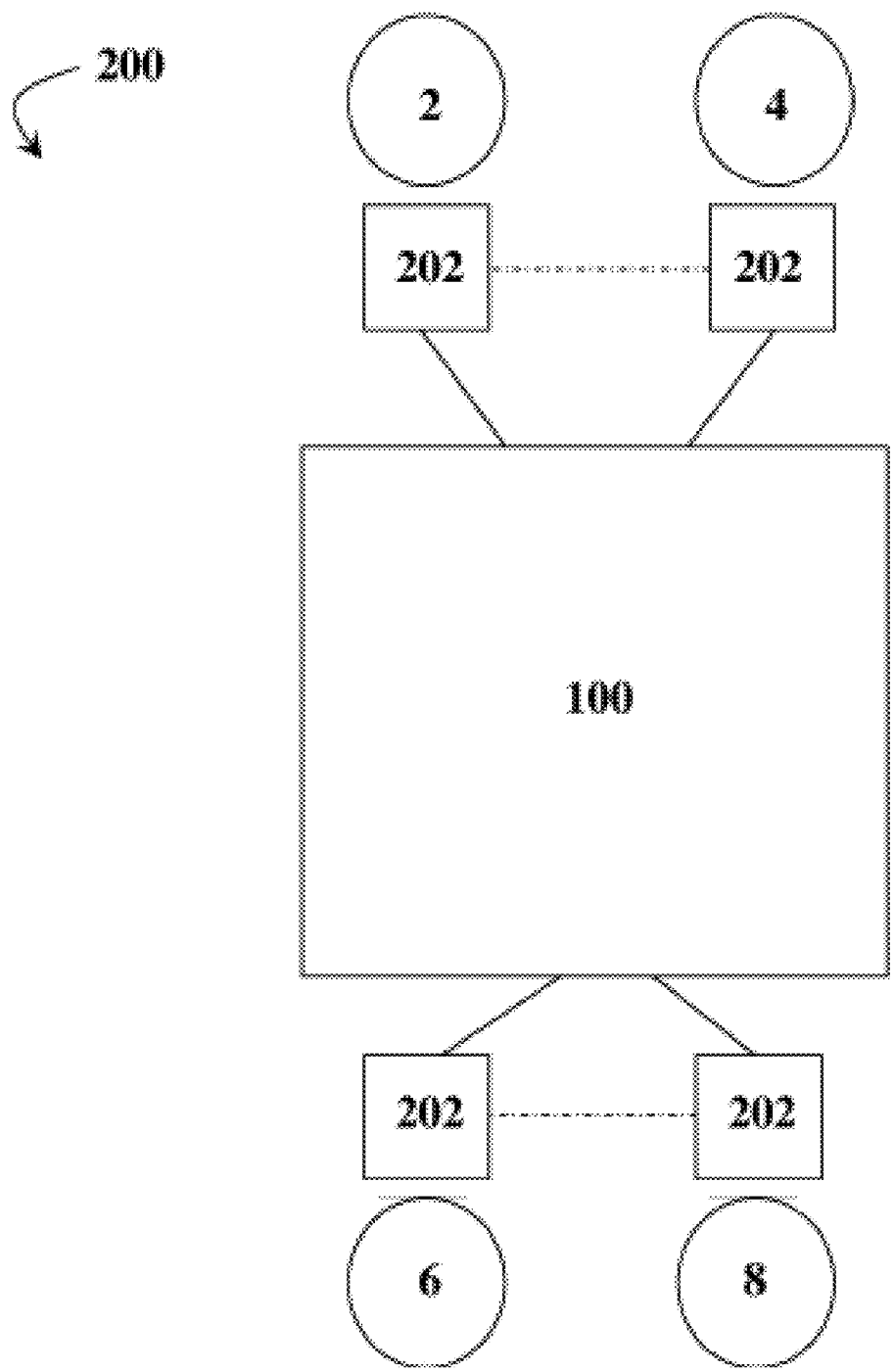
FIG. 4 is a high level block diagram of touchscreen gameboard system comprising the gameboard device of FIGS. 1A-1C.

Now referring to FIG. 4, a high level block diagram of a gameboard system 200 is shown. The gameboard system 200 comprises a gameboard device 100 as previously described and two or more handheld devices 202. Perhaps more specifically, when the gameboard system 200 is used in gameplay, each user playing the game (each a "player") will have their own handheld device 202 for use in connection with the gameboard device 100 and gameplay. Accordingly, in at least one embodiment, the number of handheld devices 202 in use with the system 200 will depend on how many users are using the system 200 to play a single game.

The handheld devices 202 of the system 200 are configured for use in conjunction with the gameboard device 100, but enable a degree of secrecy with respect to the associated user's gameplay. For example, where the gameboard system 200 is used to play a game that requires cards to be held privately (as opposed to laid out on the virtual gameboard), each of the users may utilize their handheld devices 202 to keep their virtual cards to themselves. In at least one commercial example of, the gameboard device 100 may be packaged and sold with four dedicated handheld devices 202 as the gameboard system 200.

The handheld devices 202 comprise private game screens, each about the size of a business card, that are dedicated solely for use with the gameboard device 100. Additionally or alternatively, the handheld devices 202 may comprise a user's smartphone, a computer tablet device, or any other device capable of executing a software application that enables two-way communication between such device and the gameboard device 100. In general, it will be understood that each handheld device 202 comprises at least any hardware and software (operational and application) that would occur to one skilled in the art to achieve the functionality and interactions set forth herein.

Each of the handheld devices 202 is in two-way communication with the gameboard device 100 such that it can push data thereto or receive data therefrom. Such communication can be established either through a wireless or wired connection. In at least one exemplary embodiment, both the gameboard device 100 and the handheld devices 202 are enabled for Bluetooth technology.

In addition to each of the handheld devices 202 being in two-way communication with the gameboard device 100, in at least one embodiment, each handheld device 202 is configured to communicate on one or more of the other users' private device(s) 202. In this manner, if the game being played with the gameboard system 200 requires certain players to associate and work as a team (e.g., card games—such as Spades—that require teams of two or more), secured communication can be established between the handheld devices 202 of team members to facilitate communication and the sharing of information therebetween (schematically represented by the dashed lines in FIG. 4). Additionally or alternatively, non-secured communication can be established between all of the handheld devices 202 such that users can send taunts or words of congratulations to other users as a type of chat or social media, thus further marrying the components and benefits associated with both virtual gaming and co-located users.

Certain accessories may be configured for use with the gameboard system 200. In at least one embodiment, the gameboard system 200 further comprises a carrying case 126 configured to snugly fit both the gameboard device 100 and any handheld devices 202 of the system 200. Additionally or alternatively, the system 200 may further include racks or holders designed for use with the handheld devices 202. Perhaps more specifically, each rack or holder may be configured to support a handheld device 202 in an upright position such that a user can set their handheld devices 202 in front of them during gameplay.

While various embodiments of the gameboard devices and systems have been described in considerable detail herein, the embodiments are merely offered as non-limiting examples of the disclosure. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A digital gameboard device comprising:
   a housing comprising a length, a width, and a thickness;
   a mobile computer positioned within the housing, the mobile computer comprising a processor, a storage medium, and one or more applications executable by the processor and configured to interact with the storage medium;
   a screen extending across a top of the housing and comprising a first portion and a second portion, at least the first portion or the second portion comprising a display having touchscreen technology; and
   a first hinge positioned along at least a portion of a first axis, the first hinge comprising a first rod and at least two first attaching means coupled therewith, each of the first attaching means coupled with either the first or second portion of the screen and configured to be stretchable by pulling the screen portion coupled thereto away from the rod;
   wherein the device is configured to be foldable about the first axis and to provide games and interactive content to two or more co-located users by running at least one of the applications on the processor.

2. The digital gameboard of claim 1, wherein the device is configured to move about the first axis between a substantially open configuration and a substantially closed configuration.

3. The digital gameboard of claim 2, wherein when the device is positioned in the substantially closed configuration, the screen is substantially encased within the housing.

4. The digital gameboard of claim 1, wherein:
   the screen further comprises a third portion;
   the device further comprises a second hinge positioned along at least a portion of a second axis, the second hinge comprising a second rod and at least two second attaching means coupled therewith, each of the second attaching means coupled with either the second and third portions of the screen; and
   the device is configured to be foldable about the second axis.

5. The digital gameboard of claim 1, wherein the first hinge is lockable.

6. The digital gameboard of claim 1, wherein:
   the first and second portions of the screen are coupled together about the first hinge; and
   each of the at least two first attaching means comprises a spring mechanism biased to retain the first or second portion of the screen in contact with the rod.

7. The digital gameboard of claim 1, wherein the length of the housing is at or between 20-25 inches, the width of the housing is at or between 20-25 inches, and the thickness of the housing is at or between 0.28-0.5 inches.

8. The digital gameboard of claim 1, wherein the device is configured for network capabilities.

9. The digital gameboard of claim 1, wherein at least one of the applications executable by the processor comprises a game development application configured to facilitate the user-led development of gaming applications, where the resulting gaming applications are executable on the device.

10. The digital gameboard of claim 1, further comprising one or more ports and one or more switches and wherein:
    the first portion of the screen and the second portion of the screen each comprise a channel configured to receive at least a portion of the first rod; and each of the at least two first attaching means is biased to seat the first rod within the channel of the first and second portions of the screen.

11. The digital gameboard of claim 1, wherein the screen comprises a first section for displaying a virtual gameboard and/or application content and a second section for displaying user information, application rules, and a pop-up virtual keyboard.

12. A gameboard system comprising:
a gameboard device configured to facilitate digital gameplay between two or more co-located users, the gameboard device comprising:
   a housing comprising a length, a width, and a depth,
   a mobile computer positioned within the housing, the mobile computer comprising a processor, a storage medium, and one or more applications executable by the processor and configured to interact with the storage medium,
   a screen extending across a top of the housing and comprising a first portion, a second portion, and a third portion, at least one of the first, second, and third portions comprising a display having touchscreen technology,
   a first hinge positioned along at least a portion of a first axis, the first hinge comprising a first rod and at least two first attaching means coupled therewith, each of the first attaching means coupled with either the first or second portion of the screen and configured to be stretchable by pulling the screen portion coupled thereto away from the rod, and
   a second hinge positioned along at least a portion of a second axis, the second hinge comprising a second rod and at least two second attaching means coupled therewith, each of the second attaching means coupled with either the second or third portion of the screen,
   wherein the device is configured to be foldable about the first and second axes and to provide games and interactive content to two or more co-located users by running at least one of the applications on the processor; and
two or more handheld devices, each handheld device in two-way communication with the gameboard device and capable of sending and receiving data therewith.

13. The system of claim 12, wherein the two or more handheld devices are selected from the group consisting of private game screens, smartphones, computer tablet devices, and mobile computers.

14. The system of claim 12, wherein:
the gameboard device and the two or more handheld devices each comprise Bluetooth technology through which the two-way communication is established; and
each of the at least two first attaching means comprises a spring mechanism biased to retain the first or second portion of the screen in contact with the rod.

15. The system of claim 14, wherein each of the two or more handheld devices is in two-way communication with at least one of the other handheld devices of the system.

16. The system of claim 15, wherein each of the two or more handheld devices is configured to form a secured connection with one other handheld device of the system and an unsecured connection with all of the other handheld devices of the system, such secured and unsecured connections existing concurrently.

17. The system of claim 12, further comprising a number of racks, the number of racks conforming to the number of handheld devices, and each rack configured to couple with and support a handheld device on a surface.

18. A method for playing a game using a digital gameboard device, the method comprising the steps of:
providing a digital gameboard device, the device comprising:
   a housing comprising a length, a width, and a thickness,
   a mobile computer positioned within the housing, the mobile computer comprising a processor, a storage medium, and one or more applications executable by the processor and configured to interact with the storage medium, and
   a screen extending across the top of the housing and comprising a first portion and a second portion, at least the first portion or the second portion comprising touchscreen technology, and
   a first hinge positioned along at least a portion of a first axis, the first hinge comprising a first rod and at least two first attaching means coupled therewith, each of the first attaching means coupled with either the first or second portion of the screen and configured to be stretchable by pulling the screen portion coupled thereto away from the rod,
   wherein the device is configured to be foldable about the first axis and to provide games and interactive content to two or more co-located users by running at least one of the applications on the processor;
downloading interactive content to the mobile computer, the interactive content comprising at least one gaming program;
receiving input from at least two co-located users, via the screen of the digital gameboard device, to run the at least one gaming program; and
displaying output, via the screen of the digital gameboard device, to the two or more co-located users in connection with the gaming program.

19. The method of claim 18, wherein the digital gameboard device further comprises two or more handheld devices, each handheld device in two-way communication with the gameboard device and capable of sending and receiving data with the gameboard device, and wherein the steps of receiving input and displaying output are affected, at least in part, by the two or more handheld devices.

20. The method of claim 18, wherein:
the first hinge comprises a lockable hinge having at least one automatic locking point at a preset angle;
further comprising the step of folding the device about the first axis such that the first portion of the screen is visible from a first location and the second portion of the screen is visible from a second location; and
the step of displaying output further comprises displaying output to the first co-located user positioned in the first location via the first portion of the screen and displaying output to the second co-located user positioned in the second location via the second portion of the screen, wherein the first portion of the screen is not visible from the second position and the second portion of the screen is not visible from the first position.

* * * * *